United States Patent

[11] 3,543,697

| | | |
|---|---|---|
| [72] | Inventor | Wayne H. Royer<br>York, Pennsylvania |
| [21] | Appl. No. | 735,734 |
| [22] | Filed | June 10, 1968 |
| [45] | Patented | Dec. 1, 1970 |
| [73] | Assignee | Teledyne, Inc.<br>Los Angeles, California<br>a corporation of Delaware, by mesne assignments |

[54] DOUBLE LAP OVEN HEATING SYSTEM
4 Claims, 12 Drawing Figs.

[52] U.S. Cl. .................................................. 107/55
[51] Int. Cl. .................................................. A21b 1/42
[50] Field of Search .................................................. 107/57, 55, 56, 63, 54, 54(.2), 54(.28)

[56] References Cited
UNITED STATES PATENTS

| | | | |
|---|---|---|---|
| 2,002,976 | 5/1935 | Byron | 107/55(B)UX |
| 2,220,718 | 11/1940 | Holm | 107/57 |
| 3,173,384 | 3/1965 | Dersch et al. | 107/57 |
| 3,272,155 | 9/1966 | Royer | 107/55 |
| 3,272,156 | 9/1966 | Gilgore et al. | 107/57 |
| 3,332,372 | 7/1967 | Royer | 107/57 |
| 3,347,182 | 10/1967 | Royer | 107/57 |

Primary Examiner—Walter A. Scheel
Assistant Examiner—Arthur O. Henderson
Attorney—Otto Moeller ABSTRACT: An air agitating and recirculating system for a double lap oven having an endless product carrying tray conveyor including an initial, intermediate, and a final vertically spaced horizontal longitudinally extending tray conveyor runs. An upper air-return header provided with downwardly directed vents is spaced above the initial tray conveyor run. A first series of transversely extending side-by-side contiguous headers is spaced therebelow to form an impervious partition separating the initial tray conveyor run from the tray conveyor runs therebeneath. Certain of this first series of headers form air-feeding headers provided with upwardly directed air vents. A first suction blower has its intake side connected with the upper air-return header and its discharge side connected with the air-feeding headers of the said first series of headers to provide agitation and recirculation of air around the product on said initial tray conveyor run. A lower air-feeding header provided with upwardly directed vents is spaced below the final tray conveyor run. A second series of transversely extending side-by-side contiguous headers is spaced thereabove to form an impervious partition separating the final tray conveyor run from the tray conveyor runs thereabove. Certain of this second series of headers form air-return headers provided with downwardly directed air vents. A second suction blower has its intake side connected with the said air-return headers of the second series of headers and its discharge side connected with the lower air-feeding header to provide agitation and recirculation of air around the product on said final tray conveyor run. Certain other of the said first series of headers form air-return headers provided with downwardly directed vents, and certain other of said second series of headers form air-feeding headers provided with upwardly directed vents. A third suction blower has its intake side connected with the air-return headers of said first series of headers and its discharge side connected with the air-feeding headers of said second series of headers to provide agitation and recirculation of air around the product on the intermediate tray conveyor runs.

FIG. IA

INVENTOR.
WAYNE H. ROYER
BY
Otto Moeller

INVENTOR.
WAYNE H. ROYER
BY
Otto Moeller

FIG. 2

INVENTOR.
WAYNE H. ROYER
BY
Otto Moeller

INVENTOR.
WAYNE H. ROYER
BY
Otto Moeller

DOUBLE LAP OVEN HEATING SYSTEM

BACKGROUND OF THE INVENTION

This invention relates to air agitating and recirculating means for commercial baking ovens of the type conventionally referred to as double lap ovens, wherein the products to be baked are transported back and forth through the oven on trays of an endless conveyor arranged in four superposed, vertically spaced horizontal runs or passes. Such a system is shown in my U.S. Pat No. 3,347,182 granted October 17, 1967.

It has long been recognized that agitation and recirculation of oven atmosphere provides a more uniform distribution of heat in an oven, resulting in more efficient and improved baking characteristics. It has further been recognized that for optimum results it is desirable to provide different baking conditions in different stages of the passage of the product through the oven. For this purpose it is necessary to isolate as nearly as possible the agitation and recirculation of air in one stage of travel from another, entailing the provision of a plurality of suction blowers, each having its intake and discharge sides connected by duct means to air-return and air-feeding headers for the different stages of travel of the product through the oven.

In a double lap oven having four tray conveyor passes through the oven with heating means disposed beneath each pass, it has been a problem to provide in such confined space a practical and efficient air-return and air-feeding duct and header construction that permits of a maximum volume flow of air to be recirculated through the different stages of travel of the product through the Oven.

SUMMARY OF THE INVENTION

In the construction according to the present invention, with the impervious partition separating the initial or first product run from the intermediate or second and third product runs being formed by transversely extending side by side contiguous headers, certain of which form air-feed headers for said initial product run and others form air-return headers from the said intermediate product runs, each of the air-feeding headers is provided with a maximum-area end opening communicating with a longitudinally-extending air-feed duct disposed in one sidewall of the oven, providing for a large volume of air being delivered from its associated suction-blower through the duct to the air-feeding headers.

With the impervious partition separating the intermediate product runs from the final product run being formed by similar transversely extending side-by-side contiguous headers, certain of which form air-feed headers for said intermediate product runs and others form air-return headers from the said final product run, each of the air-feeding headers is provided with a maximum-area end opening communicating with a longitudinally extending air-feed duct disposed in the other sidewall of the oven, providing for a large volume of air being delivered from its associated suction-blower through the duct to the air feeding headers.

Since there are no return headers below the final product, the air-feeding header for the final product run is adapted to handle a large volume of air. It is therefore an object of the invention to provide an air-agitating and recirculating header, suction-blower and duct arrangement in which a maximum volume of air is delivered to the air-feeding headers.

A further object is to provide an air-agitating and recirculating header, suction-blower and duct arrangement in which an independent circulating system is provided for each of the initial, intermediate and final product runs through the oven, and to provide in each optimum baking conditions.

The baking conditions in the final product run are particularly critical since this determines the final characteristics of the baked product, and any substantial commingling of recirculated air from the initial and intermediate product runs with air in the final product run will alter the desired characteristics of the baked product. It is a particular object of the invention to provide an air-agitating and circulating system that minimizes commingling of air recirculated in other parts of the oven with the air recirculated in the final product run.

Another object is to provide a duct and header construction for recirculation in a double lap oven as described above, that is simple to fabricate, easily installed, and is adapted to be accommodated in a minimum of space in the oven while insuring a larger volume of air flow than was previously considered possible.

Other objects and advantages of the invention will be apparent from the following description taken in connection with the accompanying drawings.

BRIEF DESCRIPTION OF THE DRAWINGS

FIG. 11 is a sectional view taken on the line 11–11 of FIG. 3.

Figure 1A:
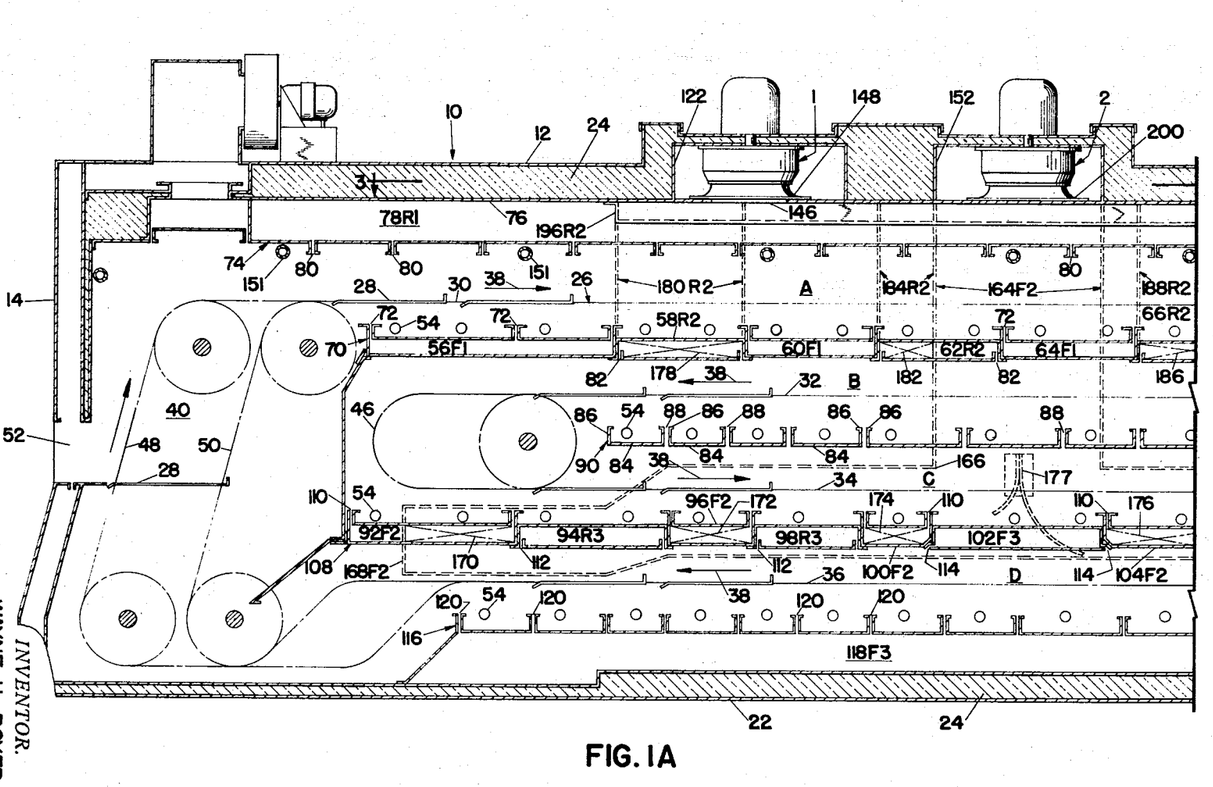
FIG. 1A and 1B are a longitudinal central vertical sectional view through the oven looking toward the left side thereof.
Figure 1B:
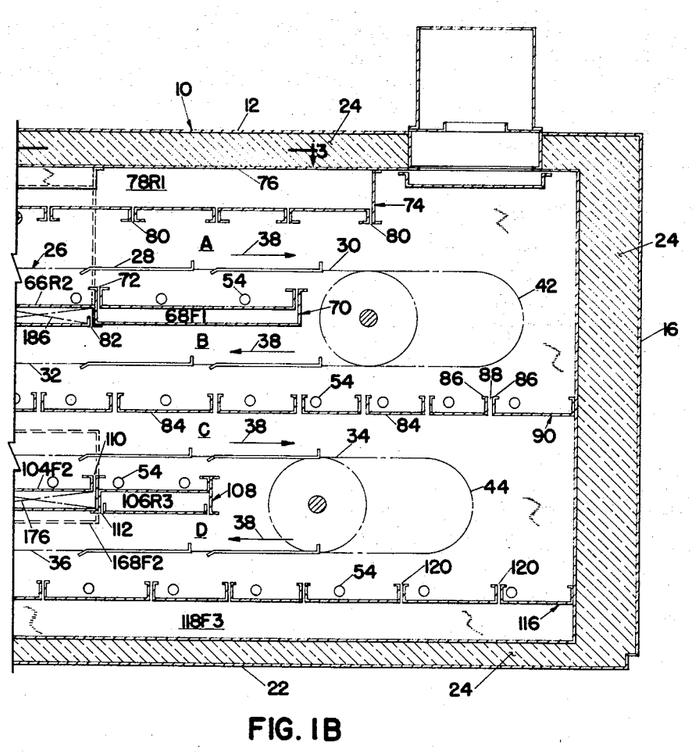
Figure 1I:
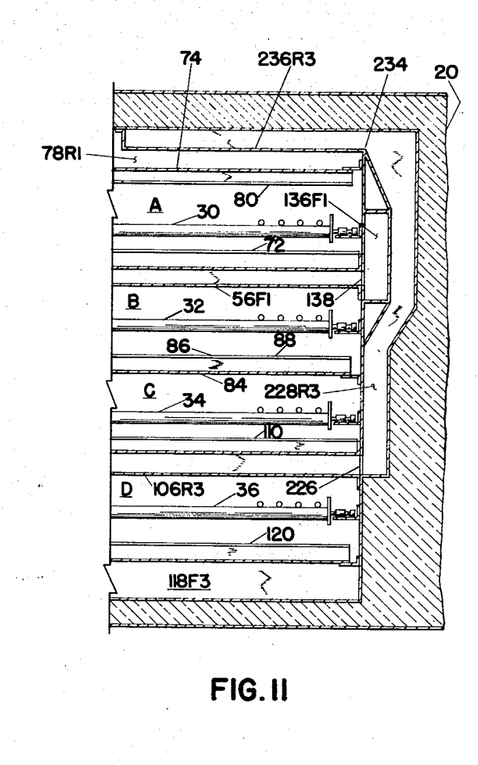
Figure 2:
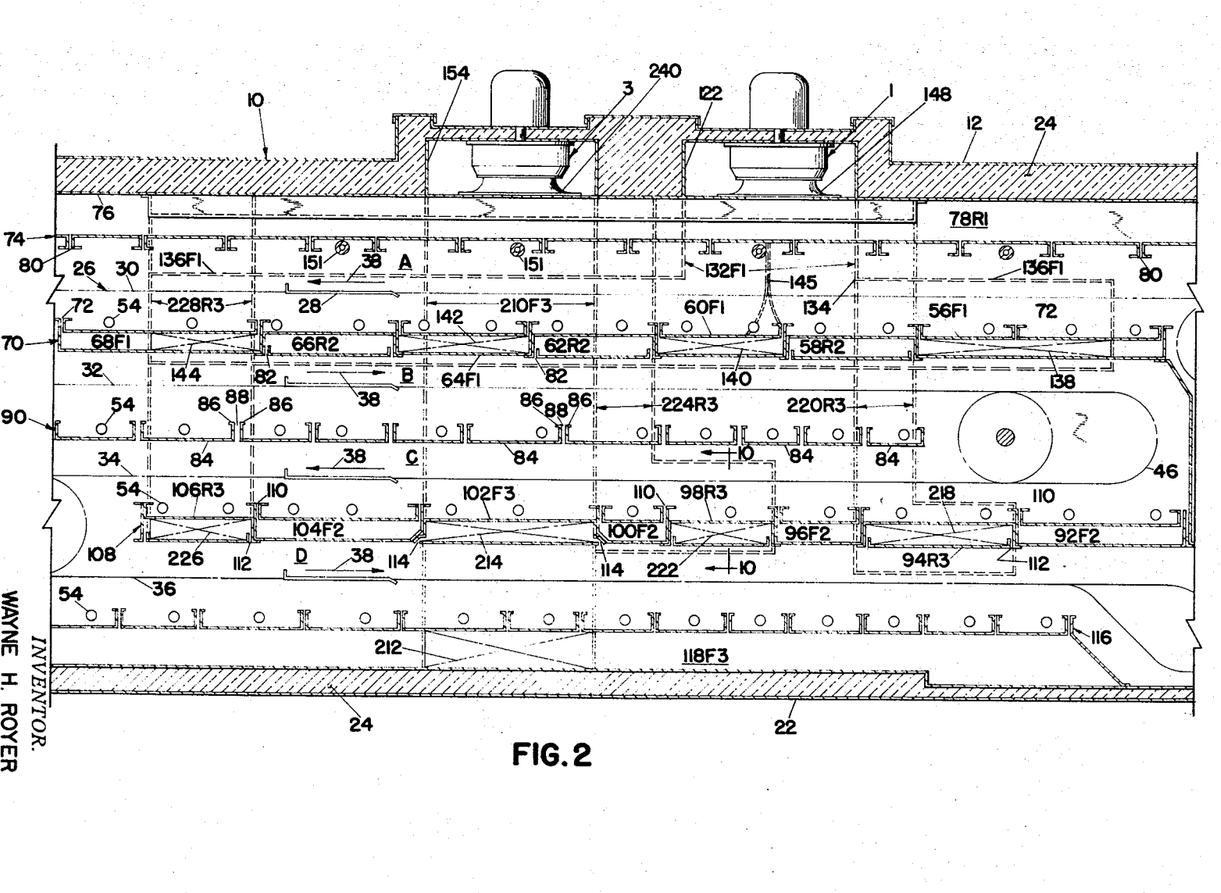
FIG. 2 is a partial central vertical sectional view through the oven looking toward the right side thereof.

Referring to the drawings, particularly to FIGS. 1A, 1B and 2, there is illustrated a double lap oven comprising a longitudinally-elongated housing 10, generally rectangular in shape, defined by a top wall 12, a front wall 14, a rear wall 16, left and right sidewalls 18 and 20 as viewed from the front of the oven, and a base 22 enclosing a baking chamber. The walls and base are formed by spaced inner and outer sheets between which is interposed suitable heat insulating material 24.

Disposed in the baking chamber of the oven is an endless tray conveyor 26 for conveying the trays 28 therethrough in an upper and a lower lap along the superimposed longitudinally extending runs 30, 32, 34 and 36. Directional arrows 38, shown in FIGS. 1A, 1B and 2, indicate the direction of travel of the trays 28 along the runs 30, 32, 34 and 36. An upright run 40 in the forward portion of the oven connecting the forward ends of the runs 30 and 36, a turn 42 in the rearward portion of the oven connecting the rearward ends of the runs 30 and 32, a turn 44 in the rearward portion of the oven connecting the rearward ends of the runs 34 and 36, and a turn 46 in the forward portion of the oven connecting the forward ends of the runs 32 and 34, completes the circuit of the trays 28 through the baking chamber.

The tray conveyor 26, illustrated rather schematically in FIGS. 1A, 1B and 2, may be of any suitable form well known in the art, and includes endless chains 48 and 50, one at each side of the oven with one chain offset forwardly of the other, chain 48 being offset forwardly of chain 50, as shown in the drawings. The chains 48 and 50 follow a circuitous path through the oven along the runs 30, 32, 34, 36 and 40, and at the turns from one run to the other they are trained over suitable sprockets and guide shoes in a manner conventional in the art.

A plurality of transversely extending, equidistantly spaced trays 28, only a representative number of which are shown, are pivotally supported at their ends by and between the chains 48 and 50. Suitable means is provided for maintaining the trays 28 in a horizontal position as they are conveyed throughout the oven. Such means for stabilizing the trays is well known in the art, and since it does not constitute a part of the present invention, it has not been shown in the drawings.

The upright run 40 of the tray conveyor 26 is arranged to travel in close proximity to the oven opening 52, through which the trays may be loaded and unloaded with the pans of product to be baked. Such loading and unloading may be performed manually or accomplished by suitable mechanical means well known in the art.

The pans of product to be baked, upon being loaded onto successive trays 28, are passed successively through baking chamber zone A embracing the tray conveyor run 30, baking chamber zone B embracing the tray conveyor run 32, baking chamber zone C embracing the tray conveyor run 34, and baking chamber zone D embracing the tray conveyor run 36.

The heating system of the oven includes a plurality of transversely extending longitudinally spaced-apart tubular fluid fuel burners 54 in spaced relation beneath each of the tray conveyor runs 30, 32, 34 and 36. The burners 54 may be of any suitable type, conventional in the art, so that the specific construction thereof is not shown or described.

Disposed between the conveyor runs 30 and 32, subjacent the top row of burners 54 are a plurality of shallow, rectangular, laterally elongated headers 56F1, 58R2, 60F1, 62R2, 64F1, 66R2 and 68F1 that extend from the inner sheet of oven sidewall 18 to the inner sheet of oven sidewall 20. For a clearer interpretation of the drawings the suffix letters F and R in the designation of the above headers, and the various headers later referred to, indicate respectively feed-air headers and return-air headers, while the suffix numerals 1, 2 and 3 in the designation of the headers, and the various headers later referred to, indicate respectively with which of the suction blowers 1, 2 and 3 each of the headers communicates. Throughout the description the term air is employed in a generic sense to include the products of combustion from the burners 54.

The headers 56F1, 58R2, 60F1, 62R2, 64F1, 66R2 and 68F1 are disposed in side-by-side contiguity to form an imperforate horizontal partition 70 that extends laterally from the inner sheet of oven sidewall 18 to the inner sheet of oven sidewall 20, and longitudinally as nearly as practicable the length of the tray conveyor run 30, to separate zone A from zone B.

The feed headers 56F1, 60F1, 64F1 and 68F1 of partition 70 are each provided with a plurality of transversely extending, longitudinally spaced-apart, upwardly directed slotted vents 72 in their top sides longitudinally offset from the top row of burners 54 providing communication between feed headers 56F1, 60F1, 64F1, 68F1 and zone A.

A horizontal perforate partition 74 disposed below the inner or crown sheet 76 of the oven top wall 12 and spaced well above the tray conveyor run 30, extends laterally the width of the oven baking chamber from the inner sheet of oven sidewall 18 to the inner sheet of oven sidewall 20 and longitudinally as nearly as practicable the length of the oven baking chamber. In order to accommodate exhaust fans or other appurtenances, the perforate partition 74 terminates short of the ends of the oven, however, this does not materially affect the efficient functioning of my improved oven. Horizontal perforate partition 74 forms with crown sheet 76 to shallow air-return header 78R1 at the top of zone A. Partition 74 is provided with a plurality of transversely extending, longitudinally spaced-apart slotted vents 80 distributed substantially uniformly over the length of the partition 74 providing communication between air-return header 78R1 and zone A.

The return headers 58R2, 62R2, and 66R2 of partition 70 are each provided in their under sides with a plurality of transversely extending, longitudinally spaced-apart, downwardly directed slotted vents 82 providing communication between return headers 58R2, 62R2, 66R2 and zones B and C.

Disposed between the conveyor runs 32 and 34, subjacent the second row of burners 54 are a plurality of transversely extending baffle plates 84 provided along their forward and rearward edges with upright flanges 86. The baffle plates 84 extend laterally from the inner sheet of oven sidewall 18 to the inner sheet of oven sidewall 20 and spaced longitudinally apart, with the adjacent upright flanges 86 of adjacent baffle plates 84 forming between them transversely extending passages or vents 88 between adjacent burners 54 of the second row of burners 54 providing communication therethrough between zones B and C. The second row of burners 54 and baffle plates 84 therefor extend as nearly as practicable the length of the tray conveyor run 32, terminating at their forward ends adjacent the turn 46 from tray conveyor run 32 to tray conveyor run 34. The baffle plates 84 provide a horizontal perforate partition 90 separating zones B and C, the purpose of which will be hereinafter described.

Disposed between the conveyor runs 34 and 36, subjacent the third row of burners 54 are a plurality of shallow, rectangular, laterally elongated headers 92F2, 94R3, 96F2, 98R3, 100F2, 102F3, 104F2 and 106R3 that extend from the inner sheet of oven sidewall 18 to the inner sheet of oven sidewall 20. As previously explained the suffix letters F and R indicate respectively feed-air headers and return-air headers, while the suffix numerals 2 and 3 indicate respectively with which of the blowers 2 and 3 each of the headers communicates.

The headers 92F2, 94R3, 96F2, 98R3, 100F2, 102F3, 104F2 and 106R3 are disposed in side-by-side contiguity to form an imperforate horizontal partition 108 that extends laterally from the inner sheet of oven sidewall 18 to the inner sheet of oven sidewall 20, and longitudinally as nearly as practicable the length of the tray conveyor run 34, to separate zone C from zone D.

The feed headers 92F2, 96F2, 100F2 and 104F2 of partition 108 are each provided with a plurality of transversely extending, longitudinally spaced-apart, upwardly directed slotted vents 110 in their top sides longitudinally offset from the third row of burners 54 providing communication between feed headers 92F2, 96F2, 100F2, 104F2 and zone C.

The return headers 94R3, 98R3 and 106R3 of partition 108 are each provided in their under sides with a plurality of transversely extending, longitudinally spaced-apart, downwardly directed slotted vents 112 proving communication between return headers 94R3, 98R3, 106R3 and zone D.

The colorizing feed headers 102F3, disposed approximately centrally between the forward and rearward ends of partition 108, is provided with a pair of divergently downwardly directed transversely extending slotted vents 114 through which hot air, recirculated by means to be described, is discharged into zone D toward the top of the product carried by the trays of run 36. By discharging the hot air in a generally forward and rearward downward direction from the divergent vents 114, a wider dispersion thereof is provided, preventing too concentrated a stream of hot air on the product. The volume of hot air discharged from the vents 114 may be controlled in a manner hereinafter described to provide a desired degree of browning or coloring on the exposed top of the bread loaves or other products being baked, or may be entirely shut off when no additional browning or coloring is desired.

A horizontal perforate partition 116, spaced above the inner sheet of the oven base 22 and disposed subjacent the fourth row of burners 54, extends laterally the width of the oven baking chamber from the inner sheet of oven sidewall 18 to the inner sheet of oven sidewall 20 and longitudinally as nearly as practicable the length of the tray conveyor run 36. Horizontal perforate partition 116 forms with the inner sheet of oven base 22 a shallow feed header 118F3 at the bottom of zone D. Partition 116 is provided with a plurality of transversely extending, longitudinally spaced-apart, upwardly directed slotted vents 120 longitudinally offset from the bottom row of burners 54 providing communication between feed header 118F3 and zone D.

Figures 3, 10:
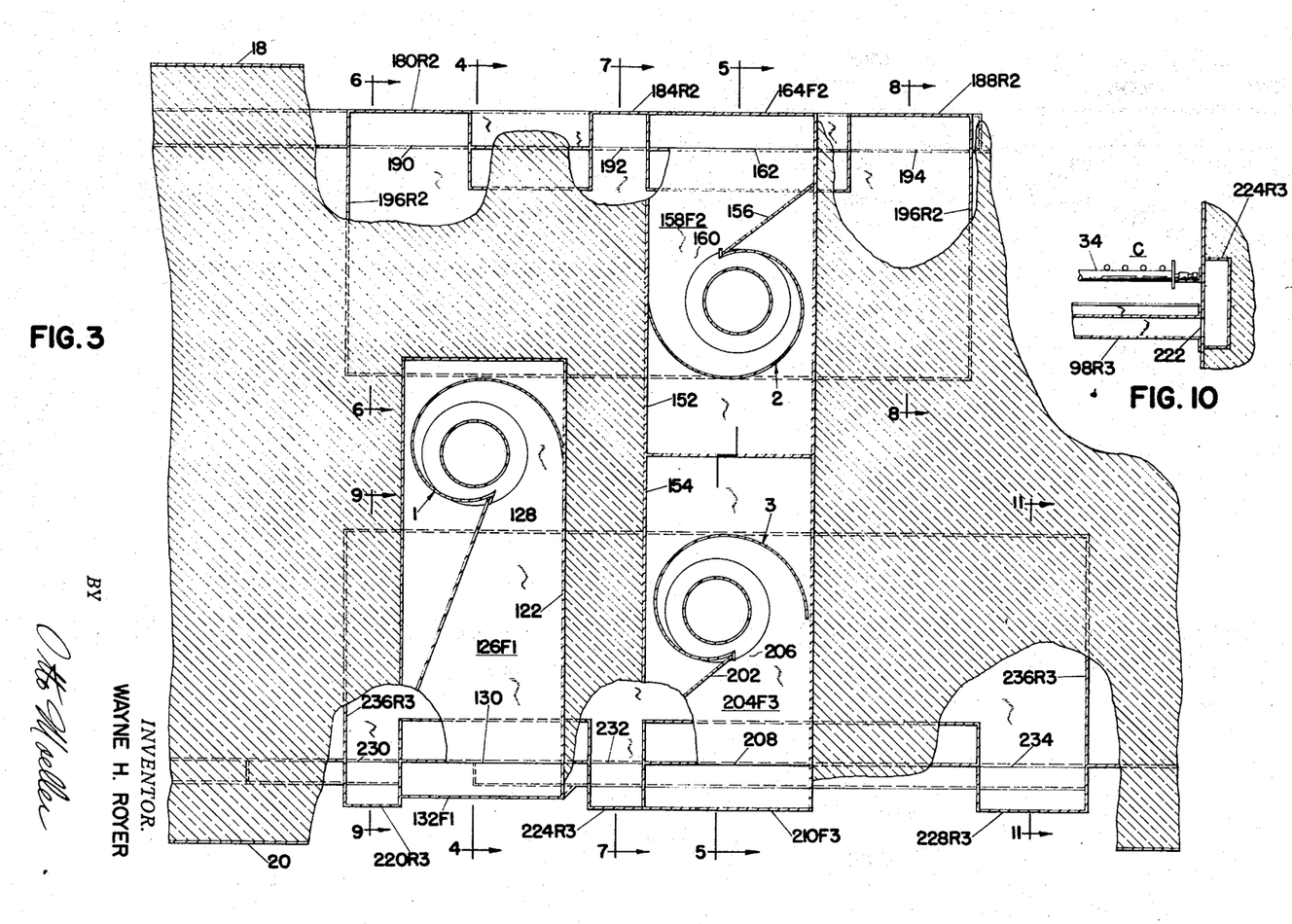
FIG. 3 is a sectional view taken on the line 3–3 of FIGS. 1A and 1B.
FIG. 10 is a sectional view taken on the line 10–10 of FIG. 2.

Referring now to the air recirculating system for zone A, a transversely extending housing 122, as best shown in FIGS. 1A, 2, 3 and 4, is disposed in the right side of the oven within the top wall 12. Mounted in the laterally inner end of housing 122 is the previously referred to suction-blower 1. A vertical angularly disposed baffle 124 in housing 122, as best shown in FIG. 3, forms therewith an outwardly flaring laterally extending feed duct 126F1 communicating at its inner end with the discharge opening 128 of the suction-blower 1 and at its outer end through opening 130 with a vertically extending feed duct 132F1 disposed between the inner and outer sheets of oven right sidewall 20. For a clearer interpretation of the drawings the suffix letters F and R in the designation of the above duct, and the various ducts later referred to, indicate respectively feed-air ducts and return-air ducts, while the suffix numerals 1, 2 and 3 in the designation of the above duct, and the various ducts later referred to, indicate respectively with which of the suction blowers 1, 2 and 3 each of the ducts communicates.

Figure 4:
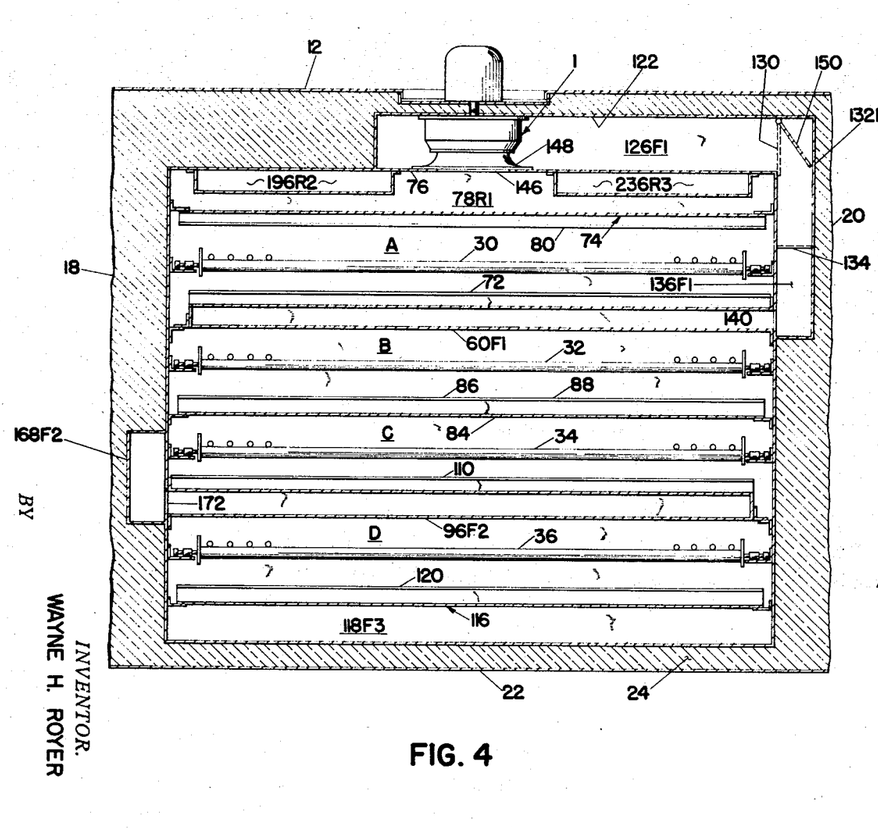
FIG. 4 is a sectional view taken on the line 4–4 of FIG. 3.

Referring more particularly to FIGS. 2 and 4, vertical feed duct 132F1 communicates through opening 134 with a longitudinally extending feed duct 136F1 disposed between the inner and outer sheets of oven right sidewall 20 laterally adjacent the feed headers 56F1, 60F1, 64F1 and 68F1, and with which it communicates through openings indicated at 138, 140, 142 and 144. Air is thus forced from the discharge side of suction blower 1 through the above described duct system into each of the feed headers 56F1, 60F1, 64F1 and 68F1 and from which feed headers the air is discharged under pressure through the previously described slotted vents 72 toward and around the pans of product in zone A as they are traveling along tray conveyor run 30. An inverted V-shaped deflector 145, see FIG. 2, is disposed in the junction of the vertical feed duct 132F1 and the longitudinally extending feed duct 136F1 to direct feed air forwardly and rearwardly into the latter duct.

Air is withdrawn from the top of zone A into the previously described return header 78R1 through the slotted vents 80. As best shown in FIG. 4 the crown sheet 76, which forms the top wall of return header 78R1 as well as the bottom wall of housing 122, is provided with a circular opening 146 embraced by the inlet ring 148 of the suction blower 1 whereby the air is withdrawn by the suction blower, ready to be recirculated.

The feed duct 126F1 is provided at opening 130 with an adjustable damper 150 mounted for pivotal swinging movement about a horizontal axis to any desired position between its full-line and phantom-line positions for controlling the volume of recirculated air. Suitable means such as an operating rod, not shown, accessible from outside the oven, is provided for adjusting the damper 150.

With the imperforate partition 70 formed by the contiguous headers 56F1, 58R2, 60F1, 62R2, 64F1, 66R2 and 68F1 substantially separating zone A from the zones therebeneath the above-described recirculating system substantially prevents commingling of zone A air with the air in the zones therebeneath. There is a great disparity between the temperature and moisture content of the product in its passage through zone A and in its passage through the zones therebeneath, so that it is desirable to isolate as nearly as possible the contact of the cooler and moisture-laden air from zone A with the product in its subsequent passage through the zones therebeneath. This is particularly important where, as shown, conventional downwardly directed live steam tubes 151 are provided in the upper forward portion of zone A, to supply additional top-moisture on the product in its initial portion of its travel through the oven.

Figure 5:
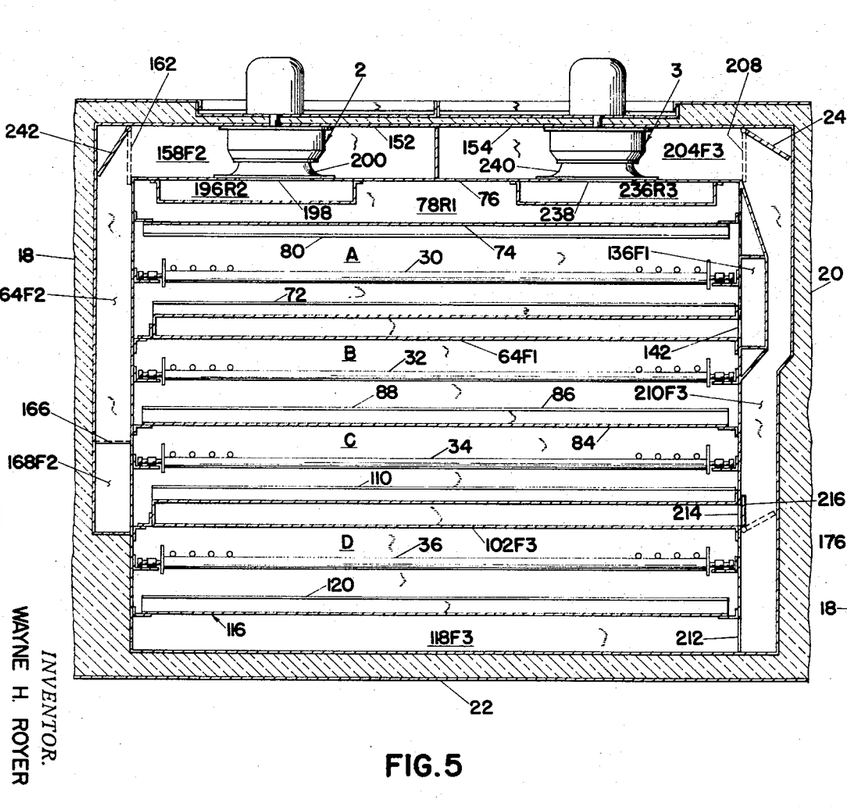
FIG. 5 is a sectional view taken on the line 5–5 of FIG. 3.

Disposed within the top wall 12 of the oven rearward of the housing 122 are a pair of laterally adjacent, transversely extending housings 152 and 154, as best shown in FIGS. 3 and 5. Referring now to the air recirculating system for zones B and C, the previously referred to suction blower 2 is mounted in the housing 152 at the left side of the oven. A vertical angularly-disposed baffle 156 in housing 152 forms therewith an outwardly flaring, laterally extending feed duct 158F2 communicating at its inner end with the discharge opening 160 of the suction blower 2 and at its outer end through opening 162 with a vertically extending feed duct 164F2 disposed between the inner and outer sheets of left sidewall 18. Referring particularly to FIGS. 1A and 5, vertical feed duct 164F2 communicates through opening 166 with a longitudinally extending feed duct 168F2 disposed between the inner and outer sheets of oven left sidewall 18 laterally adjacent the feed headers 92F2, 96F2, 100F2 and 104F2, and with which feed headers it communicates through openings indicated at 170, 172, 174 and 176. Air is thus forced from the discharge side of suction blower 2 through the above described duct system into each of the feed headers 92F2, 96F2, 100F2 and 104F2 and from which feed headers the air is discharged under pressure through the previously described slotted vents 110 toward and around the pans of product in zone C as they are traveling along tray conveyor run 34, then through the vents 88 separating the baffle plates 84 toward and around the pans of product in zone B as they are traveling along tray conveyor run 32. An inverted V-shaped deflector 177, see FIG. 1A, is disposed in the junction of the vertical feed duct 164F2 and the longitudinally extending feed duct 168F2 to direct feed air forwardly and rearwardly into the latter duct.

Figure 6:
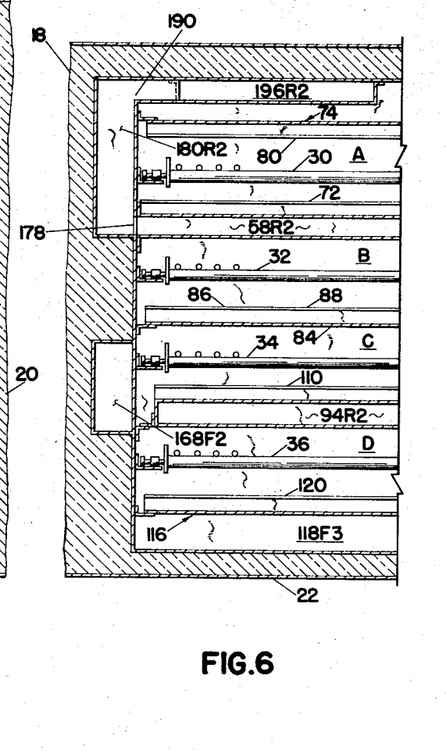
FIG. 6 is a sectional view taken on the line 6–6 of FIG. 3.
Figure 7:
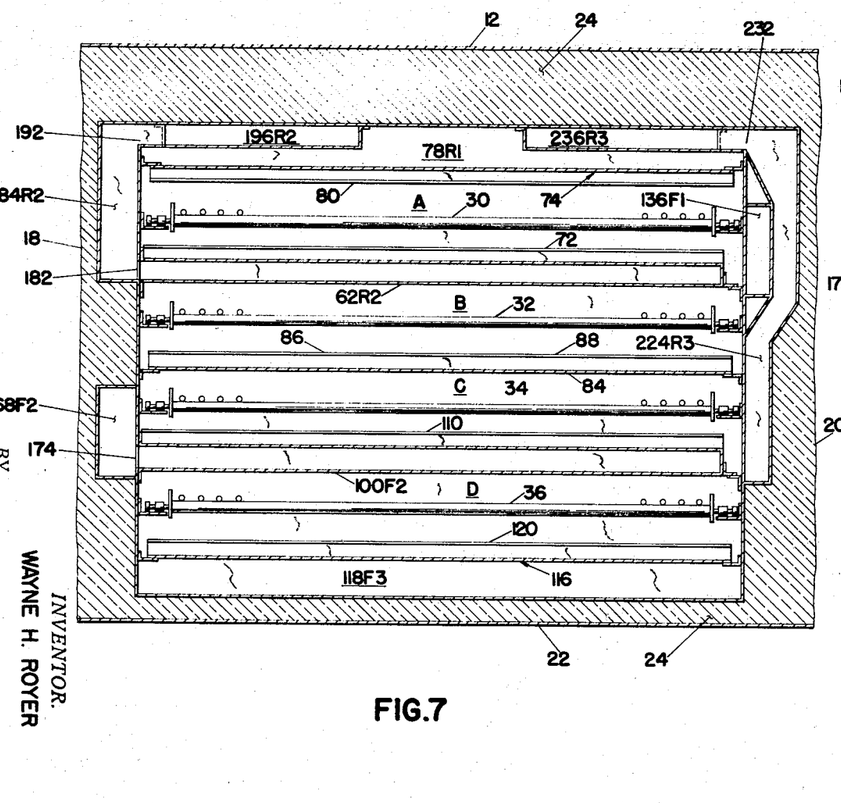
FIG. 7 is a sectional view taken on the line 7–7 of FIG. 3.
Figure 8:
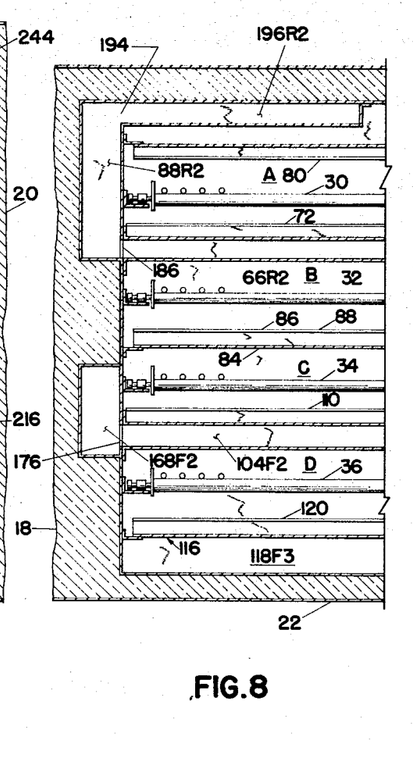
FIG. 8 is a sectional view taken on the line 8–8 of FIG. 3.

The air is withdrawn from the top of zone B into the previously described return headers 58R2, 62R2 and 66R2 through their previously described transversely extending, longitudinally spaced-apart, downwardly directed slotted vents 82. Referring to FIGS. 1A, 3 and 6, return air is withdrawn from return header 58R2 through opening 178 into the lower end of vertical return duct 180R2 disposed between the inner and outer sheets of oven left sidewall 18. Referring to FIGS. 1A, 3 and 7, return air is withdrawn from return header 62R2 through opening 182 into the lower end of vertical return duct 184R2 disposed between the inner and outer sheets of oven left sidewall 18. Referring to FIGS. 1A, 1B, 3 and 8, return air is withdrawn from return header 66R2 through opening 186 into the lower end of vertical return duct 188R2 disposed between the inner and outer sheets of oven left sidewall 18. Referring to FIGS. 1A, 1B, 3, 6, 7 and 8, return air is withdrawn from the upper ends of vertical return ducts 180R2, 184R2 and 188R2 through openings 190, 192 and 194 into a shallow return duct 196R2 disposed within the left side of the previously described return duct 78R1 and the bottom wall of which is in spaced relation above the partition 74 of the return duct 78R1. Referring particularly to FIG. 5, the inner or crown sheet 76 of oven top wall 12 which forms the top wall of return duct 196R2 is provided with a circular opening 198 embraced by the inlet ring 200 of the suction blower 2 through which the return air is withdrawn by suction blower 2 from return duct 196R2, ready to be recirculated.

Referring now to the air recirculating system for zone D, the previously referred to suction-blower 3 is mounted in the previously referred to housing 154 at the right side of the oven, as best shown in FIG. 3. A vertical angularly disposed baffle 202 in housing 154 forms therewith an outwardly flaring, laterally extending feed duct 204F3 communicating at its inner end with the discharge opening 206 of the suction blower 3 and at its outer end through opening 208 with a vertically extending feed duct 210F3 disposed between the inner and outer sheets of right sidewall 20, as best shown in FIG. 5. At its lower end vertical feed duct 210F3 communicates through opening 212 with the previously described feed header 118F3. Air is thus forced from the discharge side of suction blower 3 through the above described duct system into the feed header 118F3 and from which feed header the air is discharged under pressure through the previously described slotted vents 120 toward and around the pans of product in zone D as they are traveling along the tray conveyor run 36. Referring to FIGS. 2 and 5, vertical feed duct 210F3 also communicates through opening 214 with the previously described colorizing feed header 102F3 for discharging air through the downwardly directed vents 114 toward the top of the product traveling along tray conveyor run 36. The feed duct 210F3 is provided at opening 214 with an adjustable damper 216 mounted for pivotal swinging movement about a horizontal axis to any desired position between its full-line and phantom-line positions for controlling the relative amount of air delivered to headers 102F3 and 118F3. Suitable means such as an operating rod, not shown, accessible from outside the oven, is provided for adjusting the damper 216.

Figure 9:
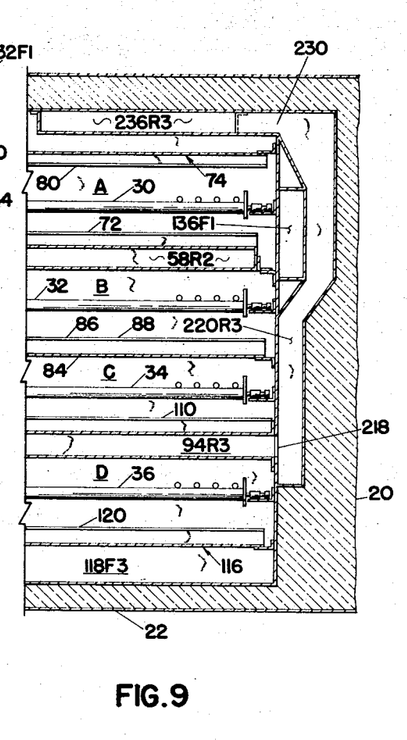
FIG. 9 is a sectional view taken on the line 9–9 of FIG. 3.

Air is withdrawn from the top of zone D into the previously described return headers 94R3, 98R3 and 106R3 through their previously described transversely extending longitudinally spaced apart downwardly directed slotted vents 112. Referring to FIGS. 2, 3 and 9, return air is withdrawn from return header 94R3 through opening 218 into the lower end of vertical L-shaped return duct 220R3 disposed between the inner and outer sheets of oven right sidewall 20. Referring to FIGS. 2, 3, 7 and 10, return air is withdrawn from return header 98R3 through opening 222 into the lower end of vertical L-shaped return duct 224R3 disposed between the inner and outer sheets of oven right sidewall 20. Referring to FIG. 2, 3 and 11, return air is withdrawn from return header 106R3 through opening 226 into the lower end of vertical return duct 228R3 disposed between the inner and outer sheets of oven right sidewall 20. Referring to FIGS. 2, 3, 7, 9 and 11, return air is withdrawn from the upper ends of vertical return ducts 220R3, 224R3 and 228R3 through openings 230, 232 and 234 into a shallow return duct 236R3 disposed within the right side of the previously described return duct 78R1 and the bottom wall of which is in spaced relation above the partition 74 of the return duct 78R1. Referring particularly to FIG. 5, the inner or crown sheet 76 of oven top wall 12 which forms the top wall of return duct 236R3 is provided with a circular opening 238 embraced by the inlet ring 240 of the suction blower 3 through which the return air is withdrawn by suction blower 3 from return duct 236R3, ready to be recirculated.

Referring to FIG. 5, opening 162 from feed duct 158F2 to vertical feed duct 164F2 and opening 208 from feed duct 204F3 to vertical feed duct 210F3 are provided respectively with dampers 242 and 244 mounted for pivotal swinging movement about a horizontal axis to any desired position between their full line and phantom line positions for controlling the volume of air recirculated by suction blowers 2 and 3.

In exceptionally long ovens, the suction blowers 1, 2 and 3 together with their associated duct and header arrangement, as described above, can be duplicated. While the invention has been shown as applied to a direct-fired oven heating system employing a series of gas burners 54 in each of the baking zones A, B, C and D, it will be understood that it is equally applicable to an indirect-fired oven heating system of well known conventional construction employing a bank of flues disposed beneath each of the tray conveyor runs 30, 32, 34 and 36, connected to a source of combustion gases.

I claim:

1. In an air recirculating system for a double lap oven having an endless product carrying tray conveyor including first, second, third and fourth vertically-spaced horizontal longitudinally-extending tray conveyor runs connected at their ends;
   means disposed in spaced relation above said first tray conveyor run forming an upper air-return header having a plurality of downwardly directed air-intake vents;
   a first series of transversely extending rectangular side-by-side contiguous headers disposed between and in spaced relation with respect to said first and second tray conveyor runs to form therebetween an impervious partition;
   said first series of headers including a plurality of headers each having a top wall provided with upwardly directed air-emission vents and an imperforate bottom wall alternating with a plurality of headers each having a bottom wall provided with downwardly directed air-intake vents and an imperforate top wall to form alternate air-feeding headers and air-return headers;
   a first suction blower;
   air feeding duct means providing communication between the discharge of said first suction blower and each of said air feeding headers of said first series of headers and air return means providing communication between said upper air-return header and the intake of said first suction blower for effecting a recirculation of air upwardly against the product on said first tray conveyor run;
   a second series of transversely extending rectangular side-by-side contiguous headers disposed between and in spaced relation with respect to said third and fourth tray conveyor runs to form therebetween an impervious partition;
   said second series of headers including a plurality of headers each having a top wall provided with upwardly directed air-emission vents and an imperforate bottom wall alternating with a plurality of headers each having a bottom wall provided with downwardly directed air-intake vents and an imperforate top wall to form alternate air-feeding headers and air-return headers;
   a second suction blower;
   air-feeding duct means providing communication between the discharge of said second suction blower and each of said air-feeding headers of said second series of headers and air-return duct means providing communication between each of said air-return headers of said first series of headers and the intake of said second suction blower for effecting a recirculation of air against the product on said second and third tray conveyor runs;
   means disposed in spaced relation below said fourth tray conveyor run forming a lower air-feeding header having a plurality of upwardly directed air-emission vents;
   a third suction blower; and
   air-feeding duct means providing communication between the discharge of said third suction blower and said lower air-feeding header and air-return duct means providing communication between each of said air-return headers of said second series of headers and the intake of said third suction blower for effecting a recirculation of air upwardly against the product on said fourth tray conveyor run.

2. A construction in accordance with claim 1 in which said upper return header, said first series of headers, said second series of headers and said lower header each extends longitudinally at least the major portion of the length of said horizontal tray conveyor runs.

3. A construction in accordance with claim 1 in which one of said second series of transversely extending side-by-side contiguous headers forms an air-feeding header having air-emission vents directed downwardly against the product on said fourth conveyor run, said last-named air-feeding header being in open communication at one end with said air-feeding duct means leading from the discharge of said third suction blower to said lower air-feeding header, and adjustable valve means in said last-named air-feeding duct means for controlling the relative amount of air delivered to said last-named air-feeding header and said lower air-feeding header.

4. In an air-recirculating system for a double lap oven having an endless product carrying tray conveyor including first, second, third and fourth superposed horizontal longitudinally-extending tray conveyor runs connected at their ends:
   means disposed in spaced relation above said first tray conveyor run forming an upper air-return header having a plurality of downwardly directed air-intake vents;
   a first series of transversely extending rectangular side-by-side contiguous headers disposed between and in spaced relation with respect to said first and second tray conveyor runs to form therebetween an impervious partition;
   said first series of headers including a plurality of headers each having a top wall provided with upwardly directed air-emission vents and an imperforate bottom wall alternating with a plurality of headers each having a bottom wall provided with downwardly directed air-intake vents and an imperforate top wall to form alternate air-feeding headers and air-return headers;
   a first suction blower;
   air-feeding duct means providing communication between the discharge of said first suction blower and each of said air-feeding headers of said first series of headers including a longitudinally-elongated duct in one oven sidewall extending substantially the length of said first series of headers, each of said air-feeding headers of said first series of headers opening endwise to said longitudinally-elongated duct, and air-return means providing communication between said upper air-return header and the intake of said first suction blower for effecting a recirculation of air upwardly against the product on said first tray conveyor run;

a second series of transversely extending rectangular side-by-side contiguous headers disposed between and in spaced relation with respect to said third and fourth tray conveyor runs to form therebetween an impervious partition;

said second series of headers including a plurality of headers each having a top wall provided with upwardly directed air-emission vents and an imperforate bottom wall alternating with a plurality of headers each having a bottom wall provided with downwardly directed air-intake vents and an imperforate top wall to form alternate air-feeding headers and air-return headers;

a second suction blower;

air-feeding duct means providing communication between the discharge of said second suction blower and each of said air-feeding headers of said second series of headers including a longitudinally elongated duct in the other oven sidewall extending substantially the length of said second series of headers, each of said air-feeding headers of said second series of headers opening endwise to said last-named longitudinally-elongated duct, and air-return duct means providing communication between the air-return headers of said first series of headers and the intake of said second suction blower for effecting a recirculation of air against the product on said second and third tray conveyor runs;

means disposed in spaced relation below said fourth tray conveyor run forming a lower air-feeding header having a plurality of upwardly directed air-emission vents;

a third suction blower; and air-feeding duct means providing communication between the discharge of said third suction blower and said lower air-feeding header and air-return duct means providing communication between each of said air-return headers of said second series of headers for effecting a recirculation of air upwardly against the product on said fourth tray conveyor run.